April 15, 1952 H. J. SHELTON, JR 2,593,353
PORTABLE PLURAL-STAGE CRUSHING, SCREENING, AND WASHING PLANT
Filed Sept. 21, 1949 7 Sheets-Sheet 1

INVENTOR
HARRY J. SHELTON, JR.
BY
ATTORNEY

INVENTOR
HARRY J. SHELTON, JR.
BY
ATTORNEY

April 15, 1952 H. J. SHELTON, JR 2,593,353
PORTABLE PLURAL-STAGE CRUSHING, SCREENING, AND WASHING PLANT
Filed Sept. 21, 1949 7 Sheets-Sheet 3

INVENTOR
HARRY J. SHELTON, JR.
BY
ATTORNEY

April 15, 1952     H. J. SHELTON, JR     2,593,353
PORTABLE PLURAL-STAGE CRUSHING, SCREENING, AND WASHING PLANT
Filed Sept. 21, 1949     7 Sheets-Sheet 4
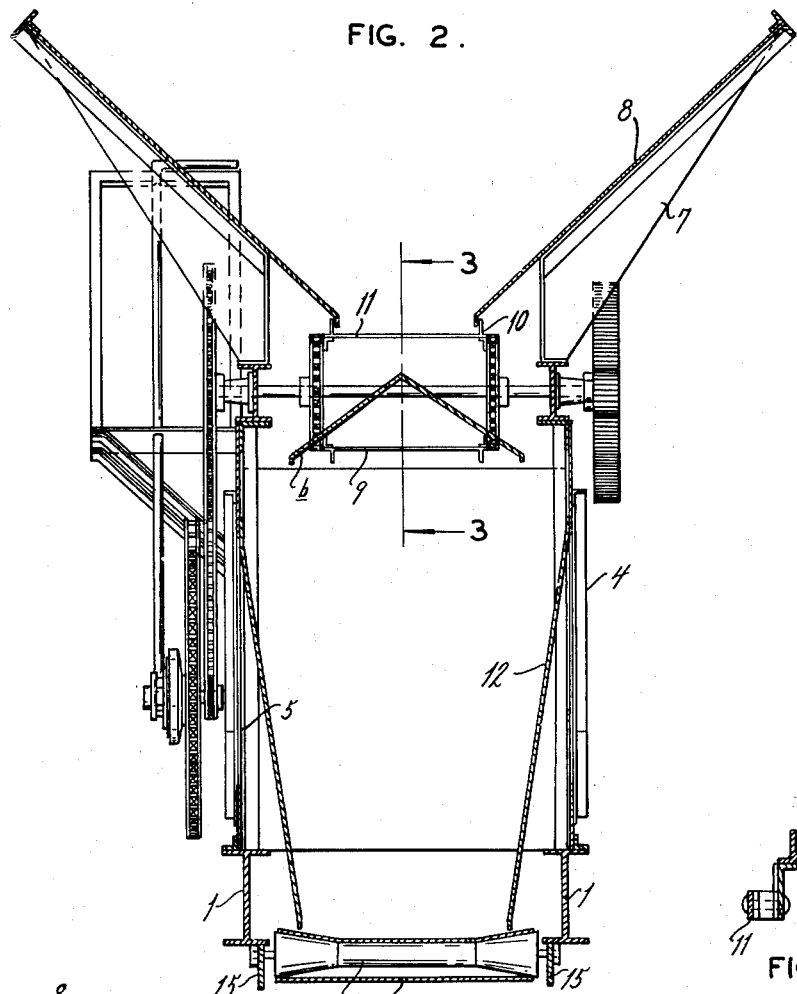
FIG. 2.
FIG. 5.
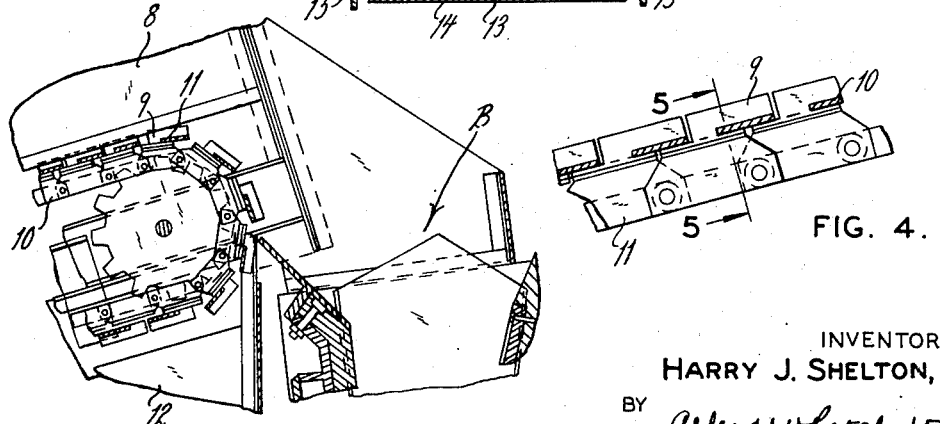
FIG. 4.
FIG. 3.
INVENTOR
HARRY J. SHELTON, JR.
BY
ATTORNEY April 15, 1952 H. J. SHELTON, JR 2,593,353
PORTABLE PLURAL-STAGE CRUSHING, SCREENING, AND WASHING PLANT
Filed Sept. 21, 1949 7 Sheets-Sheet 5
FIG. 6.
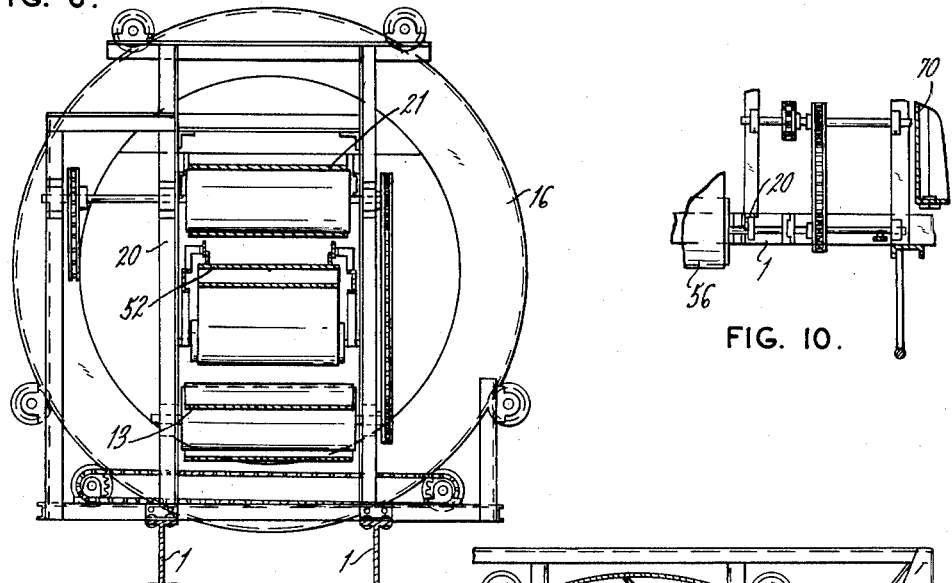
FIG. 10.
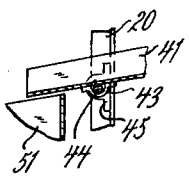
FIG. 9.
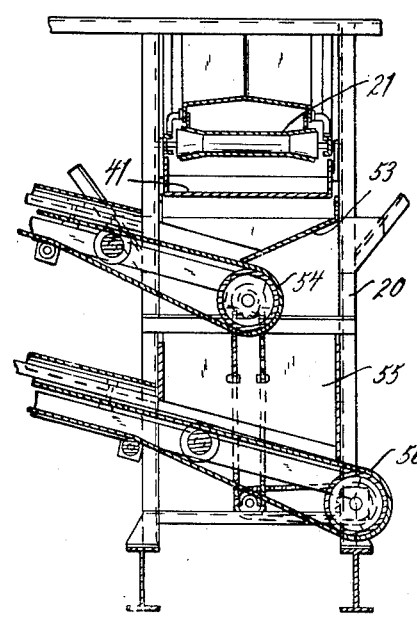
FIG. 8.
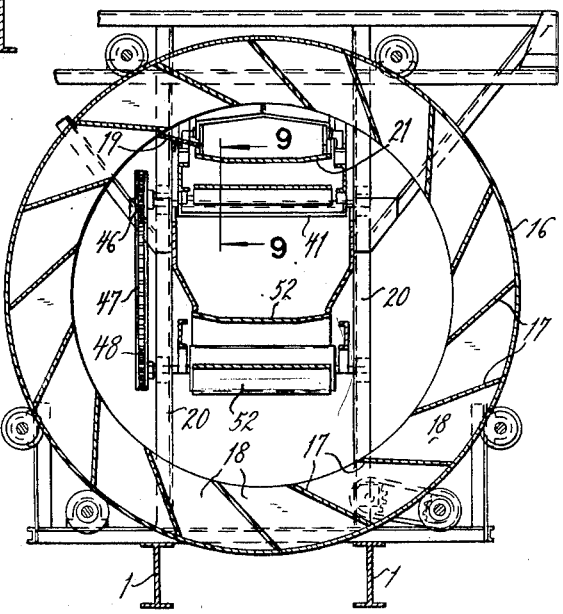
FIG. 7.
INVENTOR
HARRY J. SHELTON, JR.
BY
ATTORNEY April 15, 1952  H. J. SHELTON, JR  2,593,353
PORTABLE PLURAL-STAGE CRUSHING, SCREENING, AND WASHING PLANT
Filed Sept. 21, 1949  7 Sheets-Sheet 6

INVENTOR
HARRY J. SHELTON, JR.
BY *Alfred O. Petchaft*
ATTORNEY

April 15, 1952     H. J. SHELTON, JR     2,593,353
PORTABLE PLURAL-STAGE CRUSHING, SCREENING, AND WASHING PLANT
Filed Sept. 21, 1949     7 Sheets-Sheet 7

INVENTOR.
HARRY J. SHELTON, JR.
BY
ATTORNEY

Patented Apr. 15, 1952

2,593,353

UNITED STATES PATENT OFFICE 2,593,353

PORTABLE PLURAL-STAGE CRUSHING, SCREENING, AND WASHING PLANT

Harry J. Shelton, Jr., Ladue, Mo., assignor to Gruendler Crusher and Pulverizer Co., St. Louis, Mo., a corporation of Missouri Application September 21, 1949, Serial No. 116,895

2 Claims. (Cl. 241—101)

This invention relates in general to a certain new and improved apparatus and method for crushing rock, gravel and the like and grading the crushed material.

It is a primary object of the present invention to provide a crushing plant which is adapted for facile transportability and integrally incorporates a jaw-crusher and a roll crusher.

It is a further object of the present invention to provide a portable crushing plant having a multi-tiered grading assembly provided with spray means for cleansing material graded thereby.

It is an additional object of the present invention to provide a portable crushing plant containing means for collecting sand and other fine material in either a relatively dry or wet state as desired.

It is a further object of the present invention to provide a portable crushing plant having means for conveying material too great in size for desired grading to a roll crusher, with the material ground thereby being returned for grading operation.

It is still a further object of the present invention to provide an improved method for crushing rock, gravel, and the like, which incorporates steps for crushing raw material initially too great in size for reception into the machine, and recrushing of material of objectionable size for separating into various grades.

With the above and other objects in view, my invention resides in the novel features of form, construction, arrangement, and combination of parts presently described and pointed out in the claims.

In the accompanying drawings (six sheets)—

Figures 1, 1A, and 1B conjunctively constitute a side elevational view of a portable crushing plant constructed in accordance with and embodying the present invention;

Figure 2 is a transverse sectional view taken along line 2—2 of Figure 1;

Figure 3 is a transverse sectional view taken along line 3—3 of Figure 2;

Figure 4 is an enlarged fragmental sectional view of the grizzly;

Figure 5 is a transverse sectional view taken along line 5—5 of Figure 4;

Figure 1:
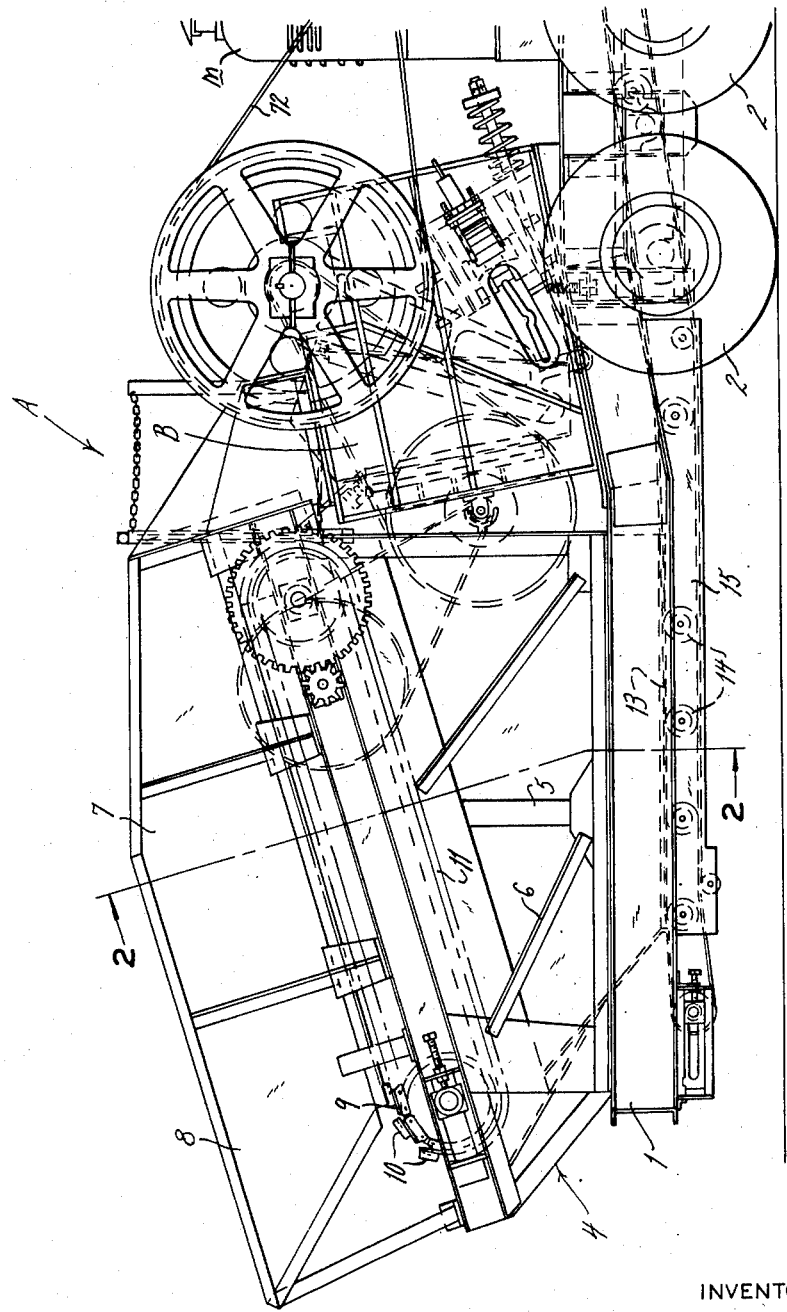
Figure 1A:
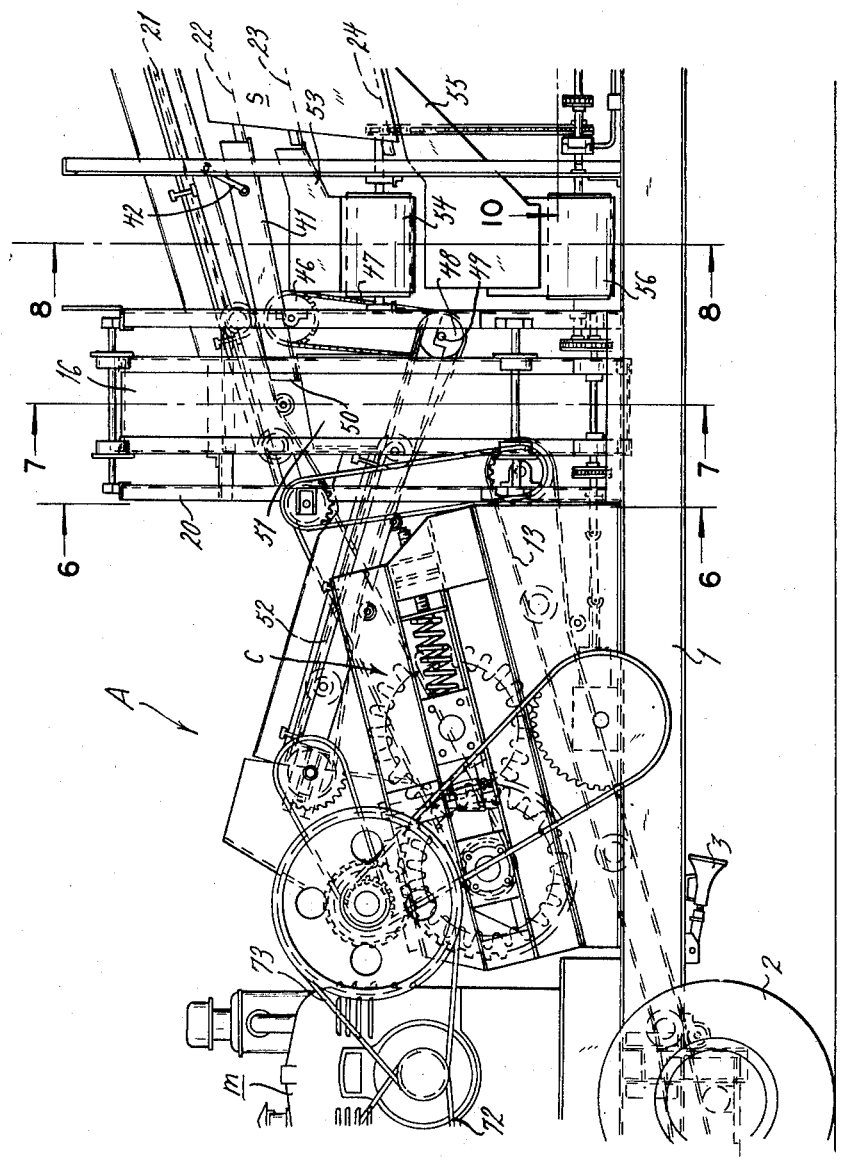
Figure 1B:
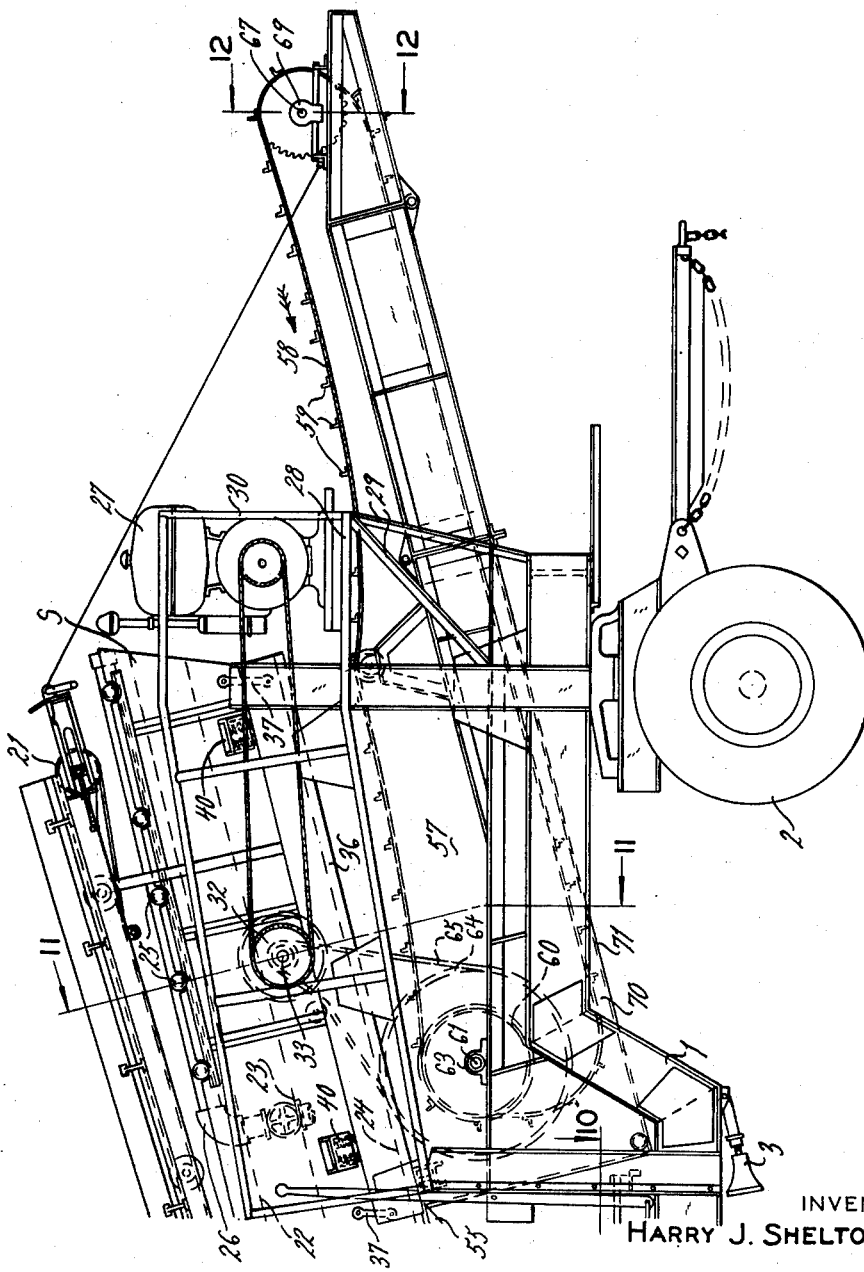
Figure 11:
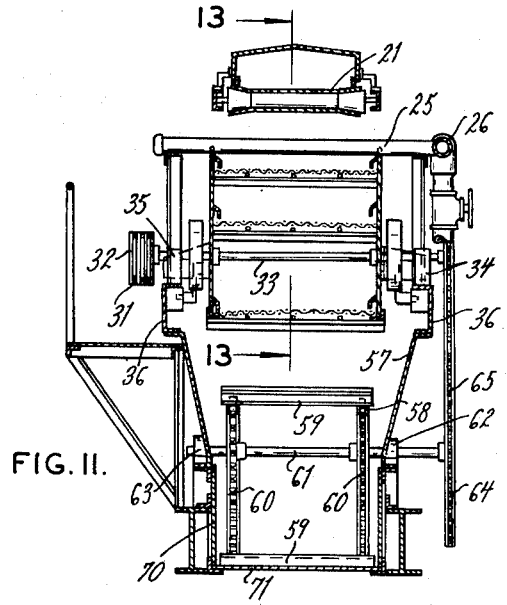
Figure 14:
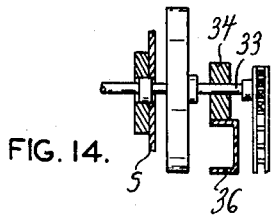
Figure 15:
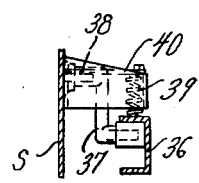
Figure 12:
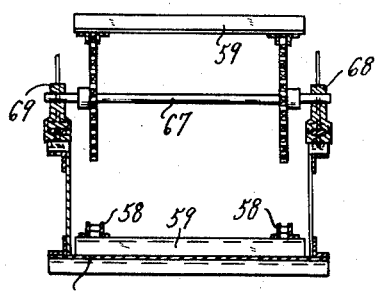
Figure 13:
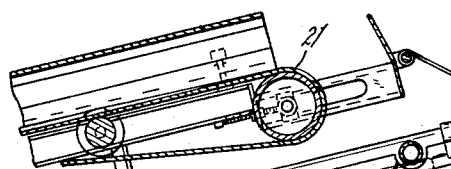
Figure 13:
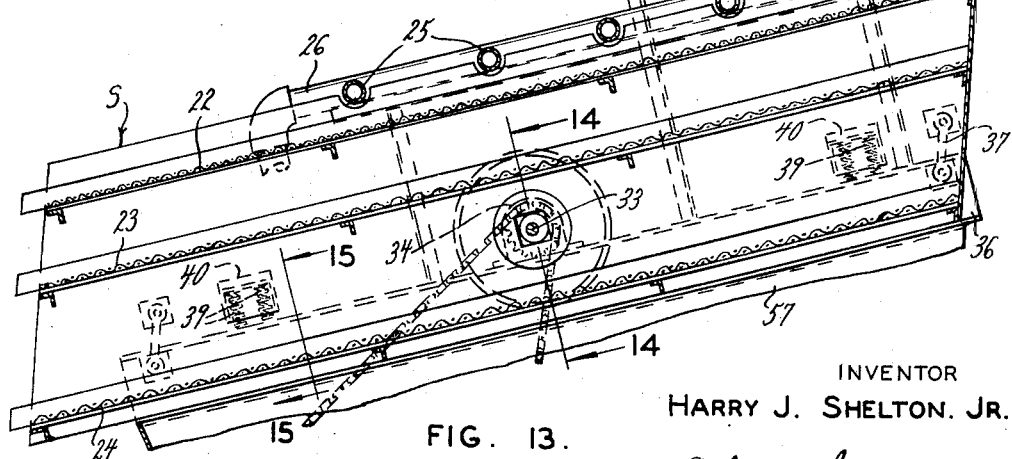
Figure 16:
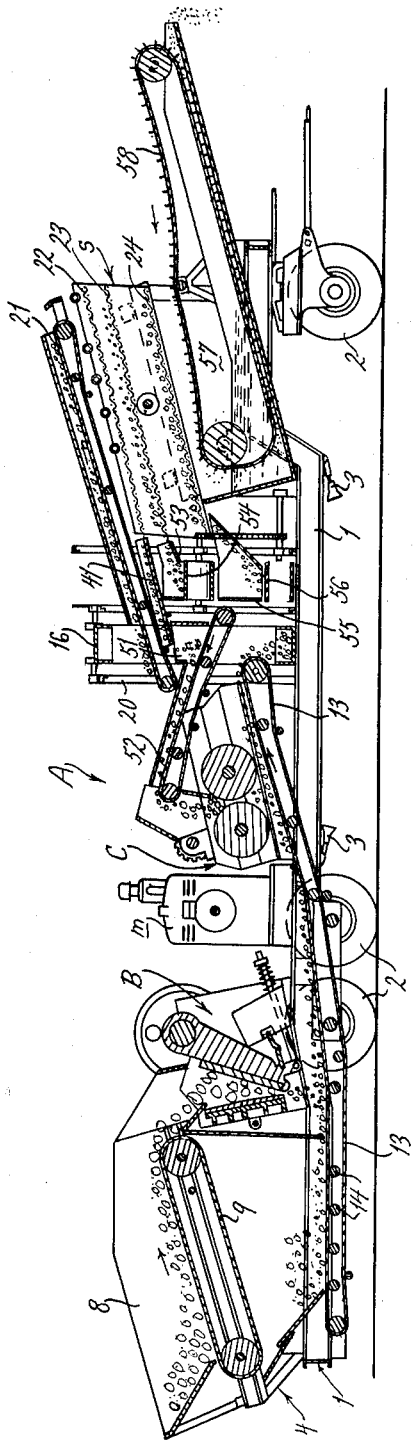

Figures 6, 7, and 8 are transverse sectional views taken along lines 6—6, 7—7, and 8—8, respectively, of Figure 1A;

Figure 9 is a fragmentary sectional view taken along line 9—9 of Figure 7;

Figure 10 is a transverse sectional view taken along line 10—10 of Figures 1A and 1B;

Figures 11 and 12 are transverse sectional views taken along lines 11—11 and 12—12, respectively, of Figure 1B;

Figure 13 is a transverse sectional view taken along line 13—13 of Figure 11;

Figures 14 and 15 are transverse sectional views taken along lines 14—14 and 15—15, respectively, of Figure 13; and Figure 16 is a longitudinal sectional view of the portable crushing plant.

Referring now by reference characters to the drawings which illustrate the preferred embodiment of the present invention, A designates a crusher plant suitably mounted upon a main frame 1 which is supported on wheels 2 for facile transportation of the plant A. Swingably mounted spacedly upon the underside of the main frame 1 is a plurality of jacks 3 for supporting the plant A upon positioning it at the desired location.

Appropriately provided upon the rearward portion of the main frame 1 is a supporting structure, generally designated, 4, comprising a plurality of uprights 5 and struts 6 for supporting a feed unit 7. Said unit 7 is integrally provided with a hopper 8 through which raw material, such as rocks and gravel, may be dumped onto a power-driven classifying coarse screen conveyor or so-called "traveling grizzly" 9 consisting of spaced link members 10 arranged in the formation of an endless belt 11. Depending upon the particular resultant material desired, grizzlies having the requisite openings may be employed for assuring that the material passing therethrough does not exceed the maximum size desired. Rigidly mounted beneath the upper run of the traveling grizzly 9 is a deflector baffle $b$ having a cross-sectional shape resembling an inverted V and acting as a shed over the lower or return run of the traveling grizzly 9. Thus the material passing through the grizzly 9 falls onto the baffle $b$ and is deflected into a chute 12 which directs it upon a conveyor belt 13 mounted upon spaced rollers 14 bearinged for rotation in longitudinally extending parallel plates 15 welded or otherwise secured to the under face of the main frame 1, (see Figure 2). Material failing to pass through the grizzly 9 is carried forwardly and discharged into an adjustable jaw crusher B preferably of the type forming the subject matter of my pending application, Serial No. 738,375, filed March 31, 1947, which matured into Patent No. 2,532,678 on December 5, 1950. Material so ground by the jaw crusher B is discharged onto the conveyor belt 13 and carried forwardly thereby, intermingled with the material originally passing through the grizzly 9, for ultimate delivery into a revolving drum-type conveyor or elevator 16 having a plurality of angularly disposed partitions 17 for forming material-carrying pockets 18. The material received by the revolving elevator 16 is thus lifted and discharged upon a forwardly moving conveyor belt 21 there being provided a plate 19 suitably mounted, adjacent the upper portion of the elevator 16, upon support frames 20, for assuring that all material so discharged will fall into a power-driven conveyor, such as the belt 21. Said belt 21, at its forward end dumps the material upon the upper deck or screen 22 of a vibrating assembly unit S having an intermediate and a lower deck 23, 24, respectively.

The size of the meshes in said decks 22, 23, 24, being of respectively increased fineness, in the order named, to provide the various resultant grades of material and are inclined lengthwise to cause the material restrained thereon to travel towards their lower-most or rearward ends.

The material discharged from the belt 21 into the screen assembly S is subjected to washing by water sprayed downwardly thereon from a plurality of transversely extending spray pipes 25 connected to a longitudinally extending manifold 26 suitably mounted upon the screen assembly S and provided with appropriate fittings and pipes (not shown) for connection to a source of water.

Provided for vibrationally actuating the screen assembly S is an auxiliary power unit 27 mounted upon the forward portion of a platform 28 suitably supported by frame members 29 and connected to railings 30 for permitting inspection of the working parts of the vibrator assembly S in accordance with usual practice. Said power unit 27 is drivingly connected by sprocket chain 31 to a sprocket wheel 32 mounted upon one end of a shaft 33, suitably supported by bearings 34, 35, and extending transversely through the screen assembly S, said bearings 34, 35, being mounted upon supporting frame structure, generally designated as 36, disposed laterally from the screen assembly S (see Figures 11 and 14). Pivotally mounted in the frame structure 36 are the outwardly bent ends of a plurality of spaced links 37, inwardly turned at their other ends which are swivelly mounted upon pins 38 projecting outwardly from the lateral surfaces of the screen assembly S, said links 37 permitting and controlling the length and amplitude of the reciprocal movement of the screen assembly S during vibration thereof. Provided for shock-absorbing purposes to prevent undue vibration of the frame structure 36 is a plurality of coil springs 39 bearing at their lower ends upon the upwardly presented margins of said frame structure 36 and bearing at their upper ends against the lateral face of L-shaped brackets 40 suitably mounted upon said structure 36. Thus it will be seen that during rotation of the shaft 33, the screen assembly S will be vibratingly actuated by rotation of the links 37.

Material failing to pass through the top deck or screen 22 is discharged upon a rearwardly and downwardly inclined vibrating tray 41 which is swingably suspended at its forward and upper end from links 42 and at its lower or discharge end is provided with bearings 43 eccentrically journaled upon a shaft 44 which is, in turn, operatively mounted in bearings 45 and drivingly connected by a sprocket 46 and roller chain 47 to a sprocket 48 mounted on the extended end of a horizontal tail shaft 49. The lower or discharge end 50 of the tray 41 projects over a vertical chute 51 which discharges upon a recycling conveyor illustrated as a relatively rearwardly running, upwardly inclined conveyor belt 52 which extends through the central opening of the revolving elevator 16 and carries the material deposited thereon rearwardly for ultimate discharge into a conventional type roll crusher C mounted approximately mid-way the length of the main frame 1. The material so crushed thereby is deposited onto the conveyor belt 13 and thence conveyed to the revolving elevator 16 for eventual return to the vibrating screen assembly S, being then sized for passage through the top deck 22. Material screened through the top deck 22 and restrained upon the intermediate deck 23 will be discharged at the rearward end thereof into a chute 53 and conducted outwardly to one side of the machine A by a conveyor belt 54 for ultimate collection in any suitable receptacle. The material passing through the intermediate deck 23 and being restrained by the lower deck 24 is likewise discharged into a chute 55 and carried outwardly by a conveyor belt 56 for loading into any suitable receptacle. The fine matter, such as sand, dirt, silt, and the like, passing through the lower deck or screen 24 falls through a hopper 57 (see Figure 11) mounted beneath the vibrating screen assembly S and onto a drag conveyor belt 58, fabricated preferably of rubber and having spaced cleats 59 mounted thereon. The drag 58 is of the endless belt type and extends at its rearward end about spaced drive pulleys 60 rotatably mounted upon a transversely extending shaft 61 supported by bearings 62, 63, provided outwardly of the walls of the hopper 57, said shaft 61 having mounted on one end a wheel 64 drivenly connected by a belt 65 to the shaft 33 (see Figure 11) for actuation by the auxiliary power unit 27. At its forward end the drag conveyor 58 extends about a pair of spaced head pulleys 66 suitably mounted upon a shaft 67 appropriately supported in bearings 68, 69, at the forward extremity of the plant A. The lower portion of the drag conveyor 58 is disposed within a tank 70 mounted upon the frame 1, and having an upwardly inclined, longitudinally extending bottom wall 71. The tank 70 is located beneath the hopper 57 for receiving the wash water cascading downwardly through the screening assembly S from the spray pipes 25 and is suitably provided with conventional overflow means (not shown).

The drag conveyor 58 may be operated as a drag by rotation of the drive pulleys 60 in a counter-clockwise manner, (as indicated by the arrow on Figure 1B), whereby the sand and other fine material deposited in the tank 70 will be dragged upwardly along the bottom wall 71 and ultimately discharged at the forward end of said conveyor 58. If it is desired that the material collected upon the drag conveyor 58 be maintained in a relatively dry state, the drive pulleys 60 may be rotated in the opposite direction for carrying the matter thereon forwardly along the top portion of the belt 58 for ultimate discharge also at its forward end.

Mounted upon the main frame 1 between the jaw crusher B and the roll crusher C is a primary power unit m, which may be either of the gasoline or diesel type, drivingly connected by V-belts 72, 73, to the jaw crusher B and the roll crusher C, respectively.

It will be noted that the plant A thus incorporates a jaw crusher B and a roll crusher C the combination of which provides marked versatility permitting the plant A to be used with equal effectiveness for rock or gravel crushing action. The jaw crusher B and the roll crusher C both contain adjusting means so that the particular grades of crushed material desired may be conveniently supplied. It is, of course, obvious that the grizzly or coarse screen 9 and the decks or screens 22, 23, 24, of the vibrating screen assembly S may be easily replaced by corresponding members of various meshes to accomplish any desired results within reasonable limits.

Additionally, it should be noted that the material collected by the intermediate and lower decks 23, 24, of the screen assembly S may be scrubbed by the spray of water to provide a clean product which is relatively dry since the water will drain downwardly carrying with it sand, grit, and the like into the tank 70. Also, the vibration of the screen assembly S will cause any particles of water which tend to adhere to the material to be shaken off.

It should be understood that changes and modifications in the form, construction, arrangement, and combination of the several parts of the portable crushing plant may be made and substituted for those herein shown and described without departing from the nature and principle of my invention.

Having thus described my invention, what I claim and desire to secure by Letters Patent is:

1. A crushing machine for rock, gravel, and the like, comprising a vibrating screen separator, an internally pocketed approximately horizontal axis revolving drum elevator at one end of the separator, a power conveyor extending from within said revolving conveyor to receive material therefrom to a point above the screen separator to deposit said material onto the screen separator, a crusher spaced from the separator on the opposite side of the revolving elevator therefrom, a recycling conveyor extending through the revolving elevator beneath the power conveyor from a point adjacent the overs discharge of the separator to a point above the crusher to receive maximum sized "overs" from the screen and to convey them directly to the crusher.

2. A crushing machine for rock, gravel, and the like, comprising an elongated mobile frame, a power driven coarse screen on one end portion of the frame for initial separation of raw material fed into the machine, a first adjustable crusher at one end of the coarse screen in position to receive all "overs" rejected by the coarse screen, a first conveyor extending lengthwise of the frame beneath the coarse screen and the first crusher, a vibrating screen separator extending lengthwise of the frame substantially at the opposite end thereof from the coarse screen, conveying means receiving material from the first conveyor and depositing said material onto the screen separator, a second crusher mounted on the frame intermediate the first conveyor and the vibrating screen, and a recycling conveyor receiving the maximum sized "overs" from the vibrating screen and extending therefrom to the second crusher, whereby the conveyors do not pass continuously over the first and second crushers, said conveying means comprising a revolving drum-type elevator and a conveyor extending therethrough to the upper end of the vibrating screen, the recycling conveyor extending from a point adjacent the lower end of the vibrating screen through the elevator to the second crusher.

HARRY J. SHELTON, Jr.

REFERENCES CITED

The following references are of record in the file of this patent:

UNITED STATES PATENTS

| Number | Name | Date |
|---|---|---|
| 242,581 | Austin | June 7, 1881 |
| 442,765 | Brennan | Dec. 16, 1890 |
| 706,197 | Owen | Aug. 5, 1902 |
| 1,476,880 | Earle | Dec. 11, 1923 |
| 1,611,026 | Gustafson | Dec. 14, 1926 |
| 1,876,450 | Knipple | Sept. 6, 1932 |
| 2,050,458 | Overstrud | Aug. 11, 1936 |
| 2,117,300 | Corser | May 17, 1938 |
| 2,210,093 | Morrissey | Aug. 6, 1940 |
| 2,256,731 | Winther | Sept. 23, 1941 |
| 2,276,333 | Overstrud | Mar. 17, 1942 |
| 2,325,719 | Turner | Aug. 3, 1943 |

OTHER REFERENCES

Rock Products, October 1944, pages 60-61, article entitled One Unit Crushing and Screening Plant.